United States Patent Office
3,778,385
Patented Dec. 11, 1973

3,778,385
COMPOUNDS OF Mo OR W WITH ORGANO-
METALS AS OLEFIN REACTION CATALYSTS
Ernest A. Zuech, Bartlesville, Okla., assignor to
Phillips Petroleum Company
No Drawing. Continuation-in-part of application Ser. No.
717,028, Mar. 28, 1968, which is a continuation-in-part
of application Ser. No. 635,649, May 3, 1967, both
now abandoned. This application Apr. 26, 1971, Ser.
No. 137,676
Int. Cl. C07c 3/62
U.S. Cl. 252—431 C                        15 Claims

ABSTRACT OF THE DISCLOSURE

A catalyst active for the olefin reaction including olefin disproportionation which comprises a cordination compound of molybdenum or tungsten wherein the metal is complexed with at least one of a carbonyl; trialkyl or triaryl phosphines, arsines or stilbines; or hydrocarboxylic acid ligand combined with an organometallic compound of Groups I-A, II-A, II-B, or III-A.

---

This application is a continuation-in-part of copending application, Ser. No. 717,028, filed Mar. 28, 1968, now abandoned, which is a continuation-in-part of copending application, Ser. No. 635,649, filed May 3, 1967, now abandoned.

This invention relates to the conversion of olefin hydrobons and to a homogeneous catalyst for such conversion. In one aspect this invention relates to the olefin reaction. In another aspect it relates to the conversion of olefins to other olefins having different molecular weights. In still another aspect it relates to a novel homogeneous, multi-component catalyst.

The term "olefin reaction," as used herein, is defined as a process for the catalytic conversion in the presence of a ctalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the braking of two existing unsaturated bonds between first and second carbon atoms and between third and fourth carbon atoms, respectively, and the formation of two new unsaturated bonds. Said first and second carbon atoms and said third and fourth carbon atoms can be in the same or different molecules.

The olefin reaction according to this invention is illustrated by the following reactions:

(1) The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or polyene; for example, the conversion of ethylene and 4-methylpentene-2 yields 3-methylbutene-1 and propylene;

(4) The conversion of ethylene or an acyclic mono- or polyene having three or more carbon atoms and a cyclic mono- or cyclic polyene to produce an acyclic polyene having a higher number of carbon atoms than that of any of the starting materials; for example, the conversion of cyclooctene and 2-pentene yields 2,10-tridecadiene; the conversion of 1,5-cyclooctadiene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6-cyclodecadiene and continued reaction can give higher molecular weight materials;

(6) The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and lower number of carbon atoms than that of the fed material; for example, the conversion of 1,4-pentadiene yields 1,4-cyclohexadiene and ethylene.

New catalytic processes have been discovered in recent years for the conversion of olefins to other olefinic products including products of both higher and lower molecular weight whereby olefins of relatively low value are converted to olefins of higher value. Such conversions have heretofore been carried out using heterogeneous catalysts comprising compounds such as compounds of molybdenum or tungsten and generally associated with solid materials such as alumina or silica. It has now been found that these olefin conversions can be carried out in a substantially homogeneous state using, as catalysts, selected coordination complexes of molybdenum or tungsten in combination with suitable catalytic adjuvants to produce olefin products of increased value including solid products, for example, rubber suitable for the manufacture of tires, wire coating, footwear and other industrial products.

Such coordination complexes of chromium, under similar conditions, produce some products of the olefin reaction, as above described, but also produce substantial amounts of products of polymerization, specifically dimerization or oligomerization.

It is an object of this invention to provide a method and a catalyst for the conversion of olefin hydrocarbons. It is also an object of this invention to provide a catalyst for the conversion of olefin hydrocarbons. A further object is to provide a homogeneous catalyst for the olefin reaction. Still another object is to provide a method for converting olefins to other olefins of higher and lower number of carbon atoms utilizing a homogeneous catalyst. The provisions of a homogeneous catalyst for converting olefins to other olefins of higher and lower number of carbon atoms is yet another object of the invention. Other aspects, objects and advantages of the invention will be apparent to one skilled in the art upon study of the disclosure, including the detailed description of the invention.

According to the process of this invention, terminal, internal, branched, and cyclic olefins and mixtures of these, including mixtures with ethylene, are converted into other olefins by contact with a catalyst system which forms by the admixture, under reaction conditions, of components comprising:

(a) VI-B metal complex represented by the formula $[(L)_aM_bZ_c]_x$ wherein each (L) is a CO, $R_3Q$, $R_3QO$, $R_2Q-QR_2$, or $R^2(COO)_m$ ligand; each Z is a halogen or CN, SCN, OCN, or $SnCl_3$ radical; M is Mo, W, MoO, $MoO_2$, WO, $WO_2$, preferably Mo or W; Q is phosphorus, arsenic, or antimony; $a$ is 1–6, $b$ is 1–2, generally 1, $c$ is 0–5, and the number of (L) and Z groups present in the complex is not greater than the number required for the metal to achieve the closed shell electronic configuration of the next higher atomic number inert gas; $x$ is a number, generally 1, representing the polymeric state of the complex; R is an aromatic or saturated aliphatic hydrocarbon radical, including alkoxy and halo derivatives thereof, having up to 20 carbon atoms; $m$ is 1 or 2; $R^2$ is an aromatic, saturated aliphatic, or ethylenically unsaturated hydrocarbon radical having up to 30 carbon atoms, $R^2$ being monovalent when $m$ is 1 and divalent when $m$ is 2; with (b) a catalytic adjuvant selected from (1) one or more compounds represented by $R_eAlX_f$, (2) one or more compounds represented by $R_gM'X_h$, (3) a mixture of one or more $R_eAlX_f$ or $AlX_3$ compounds with one or more compounds represented by $R'_gM'X_h$, or (4) an $AlX_3$ compound, wherein R is an aromatic or saturated aliphatic hydrocarbon radical having up to 20 carbon atoms, including alkoxy and halo derivatives thereof, preferably an alkyl radical having up to 10 carbon atoms; R' is hydrogen or R; X is halogen; M' is a metal of Group I-A, II-A, II-B or III-A; $e$ is an integer from 1 to 2; $f$ is an integer from 1 to 2, the sum of $e$ and $f$ being 3; $g$ is an integer from 1 to 3; and $h$ is 0 or an integer from 1 to 2, the sum of $g$ and $h$ being equal to the valence of M'; when acyclic olefins are converted, the preferred adjuvants are those of (1); and when cyclic olefins are converted the preferred adjuvants are those of (1) or (2).

The metals listed by groups in this specification are as those of the Periodic Table of Elements appearing in Handbook of Chemistry and Physics, Chemical Rubber Company, 45th edition (1964).

Some examples of $R_eAlX_f$ or $AlX_3$ compounds are methylaluminum dichloride, dimethylaluminum fluoride, methylaluminum sesquichloride, ethylaluminum dichloride, ethylaluminum sesquichloride, di - (2 - ethylhexyl) aluminum bromide, aluminum trichloride, aluminum tribromide, phenylaluminum dichloride, di(3-ethoxypropyl) aluminum bromide, benzylaluminum diiodide, dieicosylaluminum bromide, and the like, and mixtures thereof.

Some examples of the $R'_gM'X_h$ or $R_gM'X_h$ compounds are phenyllithium, methylsodium, t-butylpotassium, lithium hydride, lithium aluminum hydride, lithium borohydride, benzylrubidium, anthrylcesium, diethylzinc, ethylberyllium hydride, diethylmagnesium, dipropylzinc, methylcadmium chloride, triethylaluminum, dicyclohexylmercury, triisobutylaluminum, trieicosylaluminum, di(12-chlorododecyl)-aluminum chloride, methylgallium dibromide, triethylindium, triisopropylthallium, dimethylcalcium, dimethylstrontium, diethylbarium, and the like, and mixtures thereof.

A preferred class of Group VI-B transition metal complexes can be represented by the formula:

$$[R^2(COO)_m]_{a'}M''_{b'}Z'_{c'}$$

wherein M" is Mo or W, each Z is a halide radical, $a'$ is 2, $b'$ is 1, $c'$ is 1–3, $m$ is 1 or 2, $R^2$ is an aromatic, saturated aliphatic or ethylenically unsaturated hydrocarbon radical having up to about 30 carbon atoms, $R^2$ being monovalent wherein $m$ is 1 and divalent wherein $m$ is 2.

The VI-B metal complex component (a) of the catalyst system is the product formed by the admixture, under catalyst forming conditions, of a molybdenum, or tungsten compound, such as a halide, oxyhalide, hexacarbonyl, or salt of an organic acid having up to about 30 carbon atoms per molecule or an inorganic acid, preferably a halide, with a complexing agent selected from CO, $R_3Q$, $R_3QO$, $R_2Q-QR_2$ and $R^2(COOH)_m$, wherein R, $R^2$, $m$ and Q are as defined previously.

The formula $[(L)_aM_bZ_c]_x$ is used herein to identify the product obtained by admixture of a molybdenum or tungsten compound with at least one complexing agent, under catalyst forming conditions. It should be understood that the catalytic agent which has activity for conversion of the olefin feed according to the invention is the product resulting from admixture of the metal compound and the complexing agent, and the aluminum-containing compound whether or not the components are present in the complex as indicated in the formula.

Some examples of suitable VI-B starting compounds are:

| | |
|---|---|
| $MoBr_2$ | $Mo(CO)_6$ |
| $MoBr_3$ | $WBr_2$ |
| $MoBr_4$ | $WBr_5$ |
| $MoCl_2$ | $WCl_2$ |
| $MoCl_3$ | $WCl_4$ |
| $MoCl_4$ | $WCl_5$ |
| $MoCl_5$ | $WCl_6$ |
| $MoF_6$ | $WF_6$ |
| $MoO_2Br_2$ | $WI_2$ |
| $MoOCl_4$ | $WO_2Br_2$ |
| $MoO_2Cl_2$ | $Wo_2Cl_2$ |
| $MoOCl_3$ | $WOCl_4$ |
| $Mo_2O_3Cl_5$ | $WOF$ |
| $MoOF_4$ | $W(CO)_6$ |
| $Mo(C_2H_3O_2)_2$ | | and the like, and mixtures thereof.

Some examples of suitable complexing agents for the preparation of VI-B complexes are:

CO
acetic acid
oxalic acid
propionic acid
n-butyric acid
isobutyric acid
malonic acid
n-pentanoic acid
3-methylbutanoic acid
n-hexanoic acid
2,3-dimethylbutanoic acid
n-heptanoic acid
n-octanoic acid
n-decanoic acid
n-dodecanoic acid
n-hexadecanoic acid
n-eicosanoic acid
n-octadecanoic acid
n-triacontanoic acid
cyclopentanecarboxylic acid
cyclohexanecarboxylic acid
4-isobutyl-1-cyclohexanecarboxylic acid
benzoic acid
2,4,6-trimethylbenzoic acid
phenylacetic acid
4-dodecylbenzoic acid
trimethylphosphine
tri-n-butylphosphine
tri-n-decylphosphine
tri-n-eicosylphosphine
methyl-di-n-octylphosphine
tricyclohexylphosphine triphenylphosphine
tribenzylphosphine
triethylarsine
triisopropylarsine
tri-n-pentadecylarsine
diethyl-n-tridecylarsine
tricyclopentylarsine
tri(4-cyclohexylbutyl)arsine
diethylphenylarsine
tri(3,6-diphenyloctyl)arsine
tri-t-butylstibine
tri-n-nonylstibine
tri(6,8-di-n-butyldecyl)stibine
tri(3,5-dimethylcyclohexyl)stibine
methyldicyclohexylstibine
tri(2,4,6-triethylphenyl)stibine
methyldi(4-dodecylphenyl)stibine
triphenylphosphine oxide
tribenzylphosphine oxide
trimethylarsine oxide
tributylstibine oxide
tricyclopentylarsine oxide
tricyclohexylphosphine oxide
trieicosylstibine oxide
tridecylphosphine oxide
tri-p-tolylphosphine oxide
tetramethyldiphosphine
tetrabutyldiarsine
tetradecyldiphosphine
tetraphenyldistibine
tetrabenzyldiphosphine
tetracyclopentyldiphosphine
tetraethyldiarsine Some specific examples of Group VI–B complex (a) components are:

(triphenylphosphine)$_2$MoCl$_4$
(tributylphosphine)MoCl$_5$
(triphenylphosphine)(CO)$_5$Mo
Mo(CO)$_6$
(benzoate)$_2$MoCl$_3$
(stearate)$_2$MoCl$_3$
(laurate)$_2$MoCl$_3$
WO$_2$(acetate)$_2$
(tribenzylarsine oxide)WCl$_5$
(triethylstibine oxide)$_2$WCl$_3$
(tetramethyldiphosphine)MoCl$_4$
(triphenylphosphine oxide)$_3$W(CO)$_3$
MoO$_2$(acetate)$_2$
(triphenylarsine oxide)$_2$Mo(CO)$_4$
(triphenylphosphine oxide)$_3$Mo(CO)$_3$ The (a) component of the catalyst system is the product obtained by combining a molybdenum or tungsten compound with one or more ligand-forming materials. Preferably the molar proportion of transition metal salt to the selected ligand-former is in the board range of from about 0.1:1 to about 10:1, more preferably about 0.2:1 to 2:1. The products are obtained by combining these ingredients at any convenient temperature, however, excessively high temperatures at which some of the components tend to decompose or excessively low temperatures at which some of the components tend to crystallize or otherwise tend to become unreactive, should be avoided. Generally, it will be preferred to combine the components at a temperature in the range of from about −25 to about 130° C., more preferably 0 to about 60° C., for a time in the range of from a few seconds up to about 24 hours, preferably in the presence of a diluent in which the components of the reaction are at least partially soluble. Any convenient diluent such as carbon tetrachloride, methylene chloride, benzene, cyclohexane, xylene, isooctance, chlorobenzene, and the like, can be used for this purpose. Any order of addition can be used. Such reaction product mixtures need not be isolated but can be used directly in the formation of the catalyst system. In general, the (a) component is fully prepared before contact is made with the (b) component or adjuvant.

The above-described (b) and (a) components of the catalyst system are generally combined, for use in this invention, in proportions in the range of from about 0.1:1 to about 20:1, preferably from about 1:1 to about 10:1 mols of the (b) component to mols of the (a) component. The catalyst is prepared simply by combining these catalyst components under conditions of time and temperature which permit the catalytically active reagent reaction product to form. This combination occurs very readily and, in general, the components can be mixed at any convenient temperature, avoiding excessively high or low temperatures as stated above, within the range of from about −80 to about 100° C., preferably 0–60° C., for a few seconds or for periods up to several hours in the presence of a diluent in which both the components are at least partially soluble. Any convenient diluent such as benzene, xylene, cyclohexane, chlorobenzene, methylene chloride, ethylene dichloride, and the like, can be used for this purpose. Halogenated diluents are generally preferred. The mixing of these two catalyst components is generally carried out in the substantial absence of air or moisture, generally in an inert atmosphere. After the catalytic mixture is formed, it need not be isolated but can be added directly to the reaction zone as a solution in its preparation solvent. If desired, the catalyst components can be separately added, in any order, to the reaction zone either in the presence or absence of the feed olefin.

Olefins applicable for use in the process of the invention are nontertiary, non-conjugated acyclic mono- and polyenes having at least 3 carbon atoms per molecule including cycloalkyl, cycloalkenyl, and aryl derivatives thereof; cyclic mono- and polyenes having at least 4 carbon atoms per molecule including alkyl and aryl derivatives thereof; mixtures of the above olefins; and mixtures of ethylene and the above olefins. Many useful reactions are accomplished with such acyclic olefins having 3–30 carbon atoms per molecule and with such cyclic olefins having 4–30 carbon atoms per molecule. Nontertiary olefins are those olefins wherein each carbon atom, which is attached to another carbon atom by means of a double bond, is also attached to at least one hydrogen atom.

Some specific examples of acyclic olefins suitable for reactions of this invention include propylene, 1-butene, 2-butene, 1-pentene, 2-pentene, 1-hexene, 1,4-hexadiene, 2-heptene, 1-octene, 2,5-octadiene, 2-nonene, 1-dedecene, 1-tetradecene, 1-hexadecene, 3-methyl-1-butene, 1-phenylbutene-2, 4-octene, 3-eicosene, 3-heptene, 3-hexene, 1,4-pentadiene, 1,4,7-dodecatriene, 2-methyl-4-octene, 4-vinylcyclohexene, 1,7-octadiene, 1,5-eicosadiene, 2-triacontene, 2,6 - dodecadiene, 1,4,7,10,13 - octadecapentaene, 8-cyclo- and the like, and mixtures thereof.

Some specific examples of cyclic olefins suitable for the reactions of this invention are cylobutene, cyclopentene, cycloheptene, cyclooctene, 5-n-propylcyclooctene, cyclodecene, cyclododecene, 3,3,5,5-tetramethylcyclononone, 3,4,5,6,7 - pentaethylcyclodecene, 1,5 - cyclooctadiene, 1,5,9-cyclododecatriene, 1,4,7,10-cyclododecatetraene, 6-methyl-6-ethylcyclooctadiene-1,4, and the like, and mixtures thereof.

It will be understood by those skilled in the art that not all olefinic materials will be converted by the present invention with equal effectiveness. The reactions described in the present invention are equilibrium-limited reactions and, barring the selective removal of one or more products from the reaction zone, the extent of conversion will depend upon the thermodynamics of the specific system observed. Thus, conversion of olefinic materials to give specific products can be thermodynamically favored while the reverse reaction is very slow and ineffective. For example, 1,7-octatriene is converted to equilibrium-favored products such as cyclohexene and ethylene. The reverse reaction of ethylene and cyclohexene, correspondingly, goes very poorly. Other well known factors, such as steric hindrance in bulky molecules, significantly and sometimes drastically affect the rates of reaction of some olefins such that extremely long reaction times are required.

The reaction of symmetrical monoolefins with themselves, to give different olefin products, will sometimes proceed very slowly, requiring some double bond migration to take place before the reaction will proceed at a significant rate. For the same reason, the conversion of a mixture of ethylene and a 1-olefin for example can be more difficult than the conversion of ethylene with an internal olefin, some double bond isomerization also being required in this instance.

It has also been found that branching also retards the olefin reactivity in proportion to its propinquity to the reacting double bond. Analogously, the presence of inert polar substituents on the olefinic compound appears tolerable only if located some distance form the double bond.

Thus, the present invention is directed primarily to the conversion of those olefins or combination of olefins which are capable of undergoing the olefin reaction to a significant degree when contacted with the catalyst of the present invention under reaction conditions suitable for effecting the olefin reaction.

Presently preferred olefinic feed compounds are those contained in the following classes:

(1) Acyclic monoolefins, including those with aryl, cycloalkyl, and cycloalkenyl substituents, having 3–20 carbon atoms per molecule with no branching closer than about the 3-position and no quaternary carbon atoms or aromatic substitution closer than the 4-position to the double bond, and mixtures of such unsubstituted acylic monoolefins. Some examples of these are: propylene, pentene-1, pentene-2, butene-1, butene-2, 3-methylbutene-1, hexene-2, octene-4, nonene-2, 4-methylpentene-1, decene-3, 8-ethyldecene-2, dodecene-4, vinylcylohexane, 4-vinylcyclohexene, eicosene-1, and the like.

(2) A mixture of ethylene and one or more acylic unsubstituted internal monoolefins of (1). Some examples of such mixtures are: ethylene and butene-2, ethylene and pentene-2, ethylene and hexene-3, ethylene and heptene-3, ethylene and 4-methylpentene-2, ethylene and octene-4, ethylene and dodecene-4, and the like.

(3) Acyclic, non-conjugated polyenes having from 5 to about 20 carbon atoms per molecule, containing from 2 to about 4 double bonds per molecule and having at least one double bond with no branching nearer than the 3-position and no quaternary carbon atom nearer than the 4-position to that double bond, or mixtures of such polyenes. Some examples are: 1,4-pentadiene, 1,5-hexadiene, 1,7-octadiene, 2,6-decadiene, 1,5,9-dodecatriene, 4-methylheptadiene-1,6, 1,7-octadiene, 1,6-octadiene, and the like.

(4) A mixture of ethylene and one or more acyclic polyenes of (3) which contain at least one internal double bond. Some examples are: ethylene and 1,6-octadiene, ethylene and 1,5-decadiene, and the like.

(5) Cyclopentene.

(6) Cyclic and bicyclic monoolefins having 7 to 12 ring carbon atoms, including those substituted with up to 3 alkyl groups having up to about 5 carbon atoms, with no branching closer than the 3-position and with no quaternary carbon atoms closer than the 4-position to that double bond, and mixtures of such olefins including mixtures with cyclopentene. Some examples are: cycloheptene, cyclooctene, 4-methylcyclooctene, 3-methyl-5-ethylcyclodecene, cyclononene, cyclododecene, norbornene, and the like.

(7) A mixture of one or more of the monocyclic olefins of (6) with either ethylene or with one or more unsubstituted acyclic monoolefins of (1). Some examples of these are: ethylene and cycloheptene, ethylene and cyclooctene, propylene and cyclodecene, pentene-2 and cyclooctene, ethylene and cyclododecene, and the like.

(8) Cyclic and bicyclic non-conjugated polyenes having from 5 to about 12 ring carbon atoms, including those substituted with up to 3 alkyl groups having up to about 5 carbon atoms each, having at least one double bond with no branching closer than the 3-position and with no quaternary carbon atoms closer than the 4-position to that double bond, and mixtures thereof. Some examples of these are: 1,5-cyclooctadiene, 1,5,9-cyclododecatriene, 1,4-cycloheptadiene, norbornadiene, and the like.

(9) A mixture of one or more monocyclic polyenes of (8) with one or more acyclic 1-olefins having from 2 to about 10 carbon atoms, having no branching nearer than the 3-position and no quaternary carbon atoms nearer than the 4-position to the double bond. Some examples of these are: 1,5-cyclooctadiene and ethylene, 1,5,9-cyclododecatriene and ethylene, 1,5,9-cyclododecatriene and pentene-1, and the like.

(10) Polar group-substituted olefinic compounds of classes (1) through (9) containing from about 5 to about 20 carbon atoms per molecule in which the polar group, such as a halogen atom, is sufficiently removed from the active double bond (generally no nearer to the double bond than the 5-position) so as not to interfer with the reaction, and mixtures with unsubstituted members of class (1). Some examples are: 5-chloropentene-1, a mixture of pentene-2 and 5-chloropentene-1, and the like.

According to the process of the invention, the conversion of the olefin or mixture of olefins can take place at any convenient temperature in the broad range of −30 to about 150° C., preferably 0 to 75° C. The conversion can be carried out at any convenient pressure which is sufficient to maintain a liquid phase within the reaction zone. A diluent such as that used in the ctaalyst preparation or another inert solvent can be used in the reaction if desired. In general, any inert diluent which will maintain a substantially homogeneous reaction phase can be used. The time of contact will depend upon the desired degree of conversion with the specific feed olefins and the specific catalysts used but will generally be in the range of from about 0.1 minute to about 20 hours, preferably 5 to 120 minutes. The proportion of the catalyst composition to olefin feed in the reaction zone will generally be in the range of about 0.001–100 millimoles of molybdenum or tungsten per mole of olefin feed.

Any conventional contacting technique can be utilized for the olefin conversion and batchwise or continuous operation can be utilized. After the reaction period, the products can be separated and/or isolated by conventional means such as by fractionation, crystallization, adsorption, and the like. Unconverted feed materials or products not in the desired molecular weight range can be recycled. If desired, the catalyst can be destroyed by treatment with sufficient water or alcohol to deactivate the catalyst prior to the separation of the products. In some cases, he catalyst which is separated from the products can be recycled to the reaction zone for additional use.

The invention can be further illustrated by the following examples.

EXAMPLE I

Disproportionation of 1-pentene over Mo(benzoate)$_2$Cl$_3$/methylaluminum sesquichloride Pentene-1 was disproportionated in a test in which 0.09 g. of Mo(benzoate)$_2$Cl$_3$, 10 ml. of chlorobenzene, 0.1 ml. of methylaluminum sesquichloride, and 10 ml. of 1-pentene were combined in a 7-ounce pressure bottle and allowed to react for 1 hour at room temperature. After hydrolysis of the reaction mixture, gas-liquid chromatographic analysis of the organic phase showed the presence of 99.6 weight percent 1-pentene and 0.4 weight percent octene. The above shows that the catalyst has activity for the disproportionation of olefins.

EXAMPLE II

Conversion of cyclopentene over various catalysts

Cyclopentene was converted in a series of runs in the presence of an organoaluminum compound and either molybdenum trichloride distearate or molybdenum trichloride dilaurate. Organoaluminum compounds were triethylaluminum, triisobutylaluminum, diethylaluminum chloride, ethylaluminum dichloride, methylaluminum sesquichloride and ethylaluminum sesquichloride.

When conducting a reaction, toluene was charged to the reactor first and it was then purged with nitrogen. The reactor was then closed, flushed with argon; and pressured with argon to 20 p.s.i.g. In the rungs made at 5° C. the molybdenum compound was added either before or after cooling the reactor contents in an ice bath to approximately 0° C. The cooling step was not employed in run 5 which was made at 30° C. Cyclopentene was introduced after the molybdenum compound and then the organoaluminum compound. The temperature was then adjusted to the level employed for polymerization.

At the conclusion of each reaction, the reactor was shortstopped with a 10 weight percent solution of 2,2'-methylene-bis(4-methyl-6-tert-butylphenol) in isopropyl alcohol, the amount used being sufficient to provide one part by weight of the antioxidant per 100 parts by weight of cyclopentene charged to the polymerization. The reaction mixture was then diluted with 435 parts by weight toluene per 100 parts by weight of cyclopentene charged and the mixture was agitated at 30° C. After thorough mixing had occurred, agitation was continued during addition of isopropyl alcohol to coagulate the product. The liquid was decanted and the solid, rubbery product was dried overnight at 60° C. in a stream of nitrogen. Data are presented in Table I.

TABLE II

| Compounding recipes, parts by weight: | 1, gum stock | 2, tread stock | 3, tread stock oil extended |
|---|---|---|---|
| Polymer (solid, rubbery product) | 100 | 100 | 100 |
| High abrasion furnace black | | 50 | 70 |
| Aromatic oil (Philrich 5) | | 10 | 40 |
| Zinc oxide | 3 | 3 | 3 |
| Stearic acid | 2 | 2 | 2 |
| Flexamine [1] | 1 | 1 | 1 |
| Sulfur | 2.2 | 1.75 | 1.9 |
| NOBS special [2] | 1.1 | 1.0 | 1.2 |
| Physical properties, cured 30 minutes at 307° F.: | | | |
| 300% modulus, p.s.i. | 70 | 1910 | 1285 |
| Tensile, p.s.i. | 755 | 3895 | 3050 |
| Elongation, percent | 1300 | 410 | 490 |
| T, °F | [3] 12.4 | 48.6 | [4] 121 |
| Resilience, percent | 55.0 | 78.6 | 72.3 |
| Shore Hardness | 44 | 66 | 62 |

[1] Physical mixture containing 65 percent of a complex diarylamine-ketone reaction product and 35 percent of N,N'-diphenyl-p-phenylenediamine.
[2] N-oxydiethylene-2-benzothiazolesulfenamide.
[3] 45-minute cure.
[4] Test made on half size pellet. Calculated value on full size pellet was 54, based on decreased from 142 (half size) to 63 (full size) for a butadiene/stryene emulsion copolymer.

Electrical resistivity was tested on the vulcanized rubber from run 2 and found to be very high ($5.3 \times 10^{12}$ ohm-cm., unpainted slab area). This shows that the rubber is suitable for use in electrical application.

The data show that the cyclopentene rubber had good properties in both gum and reinforced stocks.

EXAMPLE III

Conversion of cycloheptene over (laurate)$_2$MoCl$_3$/DEAC

The following materials were employed for the conversion of cycloheptene:

TABLE I

| | Run number | | | | | | |
|---|---|---|---|---|---|---|---|
| | 1 | 2 | 3 | 4 | 5 | 6 | 7 |
| Cyclopentene, parts by weight | 100 | 100 | 100 | 100 | 100 | 100 | 100 |
| Toluene, parts by weight | 435 | 435 | 435 | 435 | 435 | 435 | 435 |
| Diethylaluminum chloride, mhm | 6 | | | | | | 4.5 |
| Triethylaluminum, mhm | | 4 | | | | | |
| Triisobutylaluminum, mhm | | | 4 | | | | |
| Ethylaluminum dichloride, mhm | | | | 6 | | | |
| Methylaluminum sesquichloride, mhm | | | | | 2 | | |
| Ethylaluminum sesquichloride, mhm | | | | | | 2 | |
| Molybdenum trichloride distearate, mhm | 3 | 3 | 3 | 3 | 3 | 3 | |
| Molybdenum trichloride dilaurate, mhm | | | | | | | 3 |
| Al compound:Mo compound mole ratio | 2:1 | 1.33:1 | 1.33:1 | 2:1 | | | |
| Temperature, °C | 5 | 5 | 5 | 5 | 30 | 5 | 5 |
| Time, hours | 24 | 22 | 22 | 22 | 22 | 22 | 22.5 |
| Conversion, percent | 68 | 49 | 66 | 6 | 39 | 24 | 70 |
| Type of solid product | Rubber | Rubber | Rubber | Rubber | Rubber | Rubber | Rubber |
| Inherent viscosity | 2.79 | 3.67 | 3.73 | 2.01 | 3.96 | 2.55 | |
| Gel, percent | 0 | 0 | 0 | 0 | 0 | 0 | |
| Unsaturation (by ICl titration), percent | 99.0 | 100 | 100 | | | 99.8 | |

NOTE.—mhm.= Gram millimoles per 100 grams monomer.

The product from run 1 was analyzed by gel permeation chromatography and found to have a heterogeneity index of 1.99. This value showed that the product had a narrow molecular weight distribution. This product was examined by infrared and found to contain 85 percent trans configuration and 15 percent cis configuration. There was no indication of methyl groups or conjugation. An infrared film scan of products from runs 2 through 6 showed that the product had a high percentage of trans configuration. The product from run 1 had a raw Mooney value (ML-4 at 212° F.) of 112, a cold flow of 2.1 mg./min., and a specific gravity of 0.88 g./cc. This product was evaluated in gum stock and tread stock recipes, including a recipe with a high carbon black and oil level. The compounding recipes and results are given in Table II.

Cycloheptene, parts by weight _____ 100
Toluene, parts by weight _____ 435
Diethylaluminum chloride, mhm. _____ 9
Molybdenum trichloride dilaurate, mhm. _____ 6
Al compd.: Mo compd. mole ratio _____ 11.5:1
Temperature, ° C. _____ 5
Time, hours _____ 24
Conversion, percent _____ 64

The procedure was the same as described in Example II. The molybdenum trichloride dilaurate was added prior to cooling the mixture in an ice bath. The product was a soft rubber. An infrared film scan showed a considerable amount of trans configuration in the product.

EXAMPLE IV

Conversion of cyclooctene over (stearate)$_2$MoCl$_3$/EADC

Cyclooctene was converted in accordance with the following tabulation:

| | |
|---|---|
| Cycloheptene, parts by weight | 100 |
| Toluene, parts by weight | 435 |
| Ethylaluminum dichloride, mhm. | 12 |
| Molybdenum trichloride distearate, mhm. | 3 |
| Al compd.: Mo compd. mole ratio | 4:1 |
| Temperature, °C. | 50 |
| Time, hours | 24 |
| Conversion, percent | 70 |
| Type of product | Liquid |
| Inherent viscosity | 0.04 |
| Gel, percent | 0 |

The procedure was essentially that employed in the preceding run except that after addition of isopropyl alcohol, the product was recovered by evaporation of the alcohol and hydrocarbon diluent. It was dried overnight at 60° C. under nitrogen.

EXAMPLE V

Disproportionation of pentene-2 over (triphenylphosphine)$_2$MoCl$_4$/methylaluminum sesquichloride A dry 7-ounce pressure bottle was charged with 0.15 g. of (triphenylphosphine)$_2$MoCl$_4$ and 5 ml. ethylene chloride. The mixture was cooled in an icewater bath, and 1 ml. of a one molar solution of methylaluminum sesquichloride, in chlorobenzene, was added. To this brown homogeneous solution was added 5 ml. of pentene-2. The reaction mixture was allowed to come to room temperature. It was sampled at this time and analysis showed the presence of butene and hexene disproportionation products. The reaction mixture was allowed to stand at room temperature for a total of about 16 hours. It was then hydrolyzed and analysis of the organic phase showed about a 2 percent yield of butenes and hexenes.

EXAMPLE VI

Disproportionation of propylene over tributylphosphine-treated MoCl$_5$/methylaluminum sesquichloride In a manner similar to that of Example V, propylene was contacted with 0.01 millimole of MoCl$_5$, 0.02 millimole of tributylphosphine, 0.2 ml. methylaluminum sesquichloride in 10 ml. ethylene dichloride. Analysis of the reaction mixture showed the presence of ethylene and butenes indicating disproportionation of the propylene.

EXAMPLE VII

Disproportionation of pentene-2 over Mo(CO)$_6$/ethylaluminum dichloride

A dry 7-ounce bottle was charged, under a nitrogen atmosphere, with about 0.2 g. of Mo(CO)$_6$, 10 ml. chlorobenzene, 5 ml. pentene-2, and 0.2 ml. ethylaluminum dichloride. The mixture was maintained at room temperature for 15½ hours, hydrolyzed, and analyzed. The analytical results showed the presence of 6.5 weight percent butenes, 84.4 weight percent pentenes, and 9.1 weight percent hexenes.

EXAMPLE VIII

Disproportionation of pentene-2 over (triphenylphosphine)Mo(CO)$_5$/ethylaluminum dichloride In a manner similar to that of Example VII above, about 0.2 g. of (triphenylphosphine)Mo(CO)$_5$, 10 ml. chlorobenzene, 0.2 ml. of ethylaluminum dichloride, and 5 ml. pentene-2 were contacted together for 90 minutes at room temperature. Analysis of the mixture showed 1.7 weight percent butenes, 95.2 weight percent pentenes, and 3.1 weight percent hexenes.

EXAMPLE IX

Conversion of cyclopentene over tungsten tetrachloride distearate/diethylaluminum chloride A series of runs was conducted in a manner similar to that of Example II except that cyclopentene was contacted with tungsten tetrachloride distearate and diethylaluminum chloride. The procedure was the same as that followed in Example II. Data are presented in Table III.

TABLE III

| | Run number | | | | | |
|---|---|---|---|---|---|---|
| | 1 | 2 | 3 | 4 | 5 | 6 |
| Cyclopentene, parts by weight | 10.00 | 10.0 | 10.0 | 10.0 | 10.0 | 10.0 |
| Toluene, parts by weight | 43.5 | 43.5 | 43.5 | 43.5 | 43.5 | 43.5 |
| WCl$_4$ (stearate)$_2$, mhm | 2.5 | 2.5 | 2.5 | 2.5 | 2.5 | 2.5 |
| Diethylaluminum chloride, mhm | 1.3 | 2.5 | 3.8 | 5.0 | 10.0 | 20.0 |
| Al compound: W compound, mole ratio | 0.5/1 | 1/1 | 1.5/1 | 2/1 | 4/1 | 8/1 |
| Temperature, °F | 41 | 41 | 41 | 41 | 41 | 41 |
| Time, hours | 21 | 21 | 21 | 21 | 21 | 21 |
| Conversion, percent | 31 | 59 | 50 | 34 | 27 | 18 |
| Gel, percent | 0 | 0 | 0 | 0 | 0 | 0 |
| Inherent viscosity | 4.01 | 2.42 | 2.22 | 1.79 | 1.92 | 2.34 |
| Unsaturation, percent (ICl titration) | | 97.9 | | | 96.3 | |
| Type of solid product | Rubber | Rubber | Rubber | Rubber | Rubber | Rubber |

The above data show that rubber was produced in good yield from a tungsten-containing catalyst system.

EXAMPLE X

Conversion of 1,5-cyclooctadiene over WCl$_4$(stearate)$_2$/DEAC

In a manner similar to that of Example II, 10 g. 1,5-cyclooctadiene was diluted with 39 g. cyclohexane diluent and contacted with WCl$_4$(stearate)$_2$ and diethylaluminum chloride. The latter two materials were present in proportions of 2.5 millimoles per 100 moles of monomer. The reaction was allowed to proceed for 24 hours at 41° F. at autogenous pressure. The reactions were terminated by the addition of 1 ml. isopropanol and evaporation of the reaction mixture at 60° C. under reduced pressure showed that 23 percent of the cyclooctadiene was converted to higher molecular weight material.

EXAMPLE XI

Conversion of cyclopentene with various metal complexes and diethylmagnesium

In a manner similar to Example II, MoCl$_3$(laurate)$_2$, MoCl$_2$(stearate)$_2$, MoOCl$_2$(stearate)$_1$ and WCl$_4$(stearate)$_2$ were used, in conjunction with diethylmagnesium to convert cyclopentene in a series of 21 hour runs in cyclohexane diluent at 41° F. The metal complex and diethylmagnesium were employed in proportions of 3.0 and 6.0 millimoles per 100 moles of monomer, respectively. The results of these runs are shown in Table IV below.

TABLE IV

| | Run number | | | |
|---|---|---|---|---|
| | 1 | 2 | 3 | 4 |
| Metal complex | $MoCl_3$ (laurate)$_2$ | $MoCl_2$ (stearate)$_2$ | $MoOCl_3$ (stearate) | $WCl_4$ (stearate)$_2$ |
| Conversion, percent | 23 | 21 | 10 | 51 |
| Inherent viscosity | 8.32 | 8.19 | 6.85 | 1.12 |
| Gel, percent | 0 | 0 | 0 | 0 |
| Trans., percent | 89 | | | 97 |
| Unsaturation, percent | 95.1 | | | 1.3 |

These data show that diethylmagnesium is an effective adjuvant in the catalyst systems for the conversion of cyclopentene to solid rubbery material.

In the practice of the process of this invention, the feed olefins, catalysts and operating conditions disclosed include combinations wherein other solid, rubbery materials are produced; for example, if a propylene feed and a suitable aluminum-containing adjuvant such as an organoaluminum dihalide or an organoaluminum sesquihalide are used, a solid, rubbery material is produced having characteristics of ethylene-propylene rubber. This rubbery material is useful in the manufacture of tires, wire coating, footwear and other industrial products.

The homogeneous catalysts of this invention can be deposited upon a suitable support or carrier and used in the olefin reaction, preferably where the olefin feed is in the vapor phase. Catalysts supports include solid, inorganic or organic materials conventionally used as catalyst supports or carriers such as silica, alumina, silica-alumina, titania, boria, zeolites, ion exchange resins, solid polymers containing functional groups such as those prepared by the polymerization of 4-vinylpyridine, vinyl dimethylphosphine, and the like.

The support can be impregnated with the homogeneous catalyst by wetting the support with a solution of the catalyst in a solvent which is then evaporated. The support can also be impregnated with either the (a) or (b) component and the remaining component can be added later. For example, the solid support material can be impregnated with the (a) component and the resulting composite conveniently stored until required. Just prior to use, the composite can be treated with the (b) component, or, if the reaction is in the liquid phase, the (b) component can simply be added to the reaction zone. Among solvents suitable are relatively low-boiling organic solvents such as pentane, methylene chloride, cyclohexane, and the like. The amount of homogeneous catalyst added to the support will be from 0.1 to about 30 weight percent of the total of the catalyst and support. If the support is to be activated by calcination, it is usually activated prior to the impregnation step.

Impregnation and evaporation conditions in preparing the catalyst are conventional, being carried out at temperatures up to about 150° C. Operating conditions in carrying out the olefin reaction are the same for the supported and the non-supported homogeneous catalyst systems.

I claim:
1. A catalyst consisting essentially of:
 (a) a metal complex represented by the formula
  (1) $(L)_a M_b Z_c$ wherein M is Mo, W, MoO, $MoO_2$, WO or $WO_2$; each Z is a halide radical; each (L) is represented by the formula $R_3Q$ or CO wherein at least one of (L) is CO; $a$ is an integer from 1–6, $b$ is an integer from 1–2, and $c$ is 0 or an integer from 1–5; the number of (L) and Z groups present in the complex is not greater than the number required for the metal to achieve the closed shell electronic configuration of the next higher atomic number inert gas; Q is phosphorous, arsenic, or antimony; and R is an aromatic or saturated aliphatic hydrocarbon radical, including alkoxy and halo derivatives thereof, having up to about 30 carbons; or
  (2) $[R^2(COO)_m]_{a'} \cdot M''_{b'} \cdot Z'_{c'}$ wherein M'' is Mo or W; each Z is a halide radical; $a'$ is 2, $b'$ is 1, C' is 3; $m$ is 1 or 2; $R^2$ is an aromatic, saturated aliphatic or ethylenically unsaturated hydrocarbon radical having up to about 30 carbon atoms per molecule, $R^2$ being monovalent when $m$ is 1 and divalent when $m$ is 2; and
 (b) an adjuvant which is
  (1) one or more compounds represented by $R_e AlX_f$,
  (2) one or more compounds represented by $R_g M'X_h$,
  (3) a mixture of one or more $R_e AlX_f$ or $AlX_3$ compounds with one or more compounds represented by $R'_g M'X_h$, or
  (4) an $AlX_3$ compound
   wherein R is an aromatic or saturated aliphatic hydrocarbon radical, including alkoxy and halo derivatives thereof, having up to about 20 carbon atoms; R' is hydrogen or R; X is halogen; M' is a metal of Group I-A, II-A, II-B, or III-A other than Al when $h$ is an integer from 1 to 2; $e$ is an integer from 1 to 2; $f$ is an integer from 1 to 2, the sum of $e$ and $f$ being 3; $g$ is an integer from 1 to 3, $h$ is 0, or an integer from 1 to 2, the sum of $g$ and $h$ being equal to the value of M', and wherein the molar proportion of (b) to (a) is from about 0.1:1 to about 20:1.

2. The composition of claim 5 wherein $R^2(COO)_m$ is an acid radical derived from an acid selected from the group consisting of acetic acid, oxalic acid, propionic acid, n-butyric acid, isobutyric acid, malonic acid, n-pentanoic acid, 3-methylbutanoic acid, n-hexanoic acid, 2,3-dimethylbutanoic acid, n-heptanoic acid, n-decanoic acid, n-dodecanoic acid, n-hexadecanoic acid, eicosanoic acid, n-octadecanoic acid, n-triacontanic acid, cyclopentanecarboxylic acid, cyclohexanecarboylic acid, 4-isobutyl-1-cyclohexanecarboxylic acid, benzoic acid, 2,4,6-trimethylbenzoic acid, phenylacetic acid, and 4-dodecylbenzoic acid.

3. The composition of claim 5 wherein $R^2(COO)_m$ is an acid radical derived from an acid selected from the group consisting of n-octanoic acid, n-decanoic acid, n-dodecanoic acid, n-hexadecanoic acid, n-eicosanoic acid, n-octadecanoic acid, n-triacontanoic acid, cyclopentanecarboxylic acid, cyclohexanecarboxylic acid, 4-isobutyl-1-cyclohexanecarboxylic acid, benzoic acid, 2,4,6-trimethylbenzoic acid, phenylacetic acid, and 4-dodecylbenzoic acid.

4. The composition of claim 1 wherein the metal complex (a) is (1).

5. The composition of claim 1 wherein the metal complex (a) is (2).

6. The composition of claim 1 wherein the (b) component is (1).

7. The composition of claim 1 wherein the (b) component is (2).

8. The composition of claim 1 further a diluent in which both of the (a) and (b) components are at least partially soluble.

9. The composition of claim 8 wherein the diluent is benzene, xylene, cyclohexane, chlorobenzene, methylene chloride, or ethylene chloride.

10. The composition of claim 1 further including a solid inorganic or organic support or carrier selected from the group consisting of silica, alumina, silica-alumina, titania, boria, zeolites, ion exchange resins, a solid polymer of 4-vinylpyridine and a solid polymer of vinyl dimethylphosphine.

11. The composition of claim 1 wherein the (a) component is molybdenum trichloride disterate and the (b) component is diethylaluminum chloride.

12. The composition of claim 1 wherein the (a) component is (stearate)$_2$-MoCl$_3$ and the (b) component is triethylaluminum, ethylaluminum dichloride, methylaluminum sesquichloride, or ethylaluminum sesquichloride.

13. The composition of claim 1 wherein the (a) component is Mo(CO)$_6$ or (triphenylphosphine)Mo(CO)$_5$ and the (b) component is ethylaluminum dichloride.

14. The composition of claim 1 wherein the (a) component is MoCl$_3$(laurate)$_2$, MoCl$_3$(stearate)$_2$, MoOCl$_2$(stearate) and the (b) component is diethylmagnesium.

15. The composition of claim 1 wherein (a) is molybdenum trichloride dioctanoate and (b) is diethylaluminum chloride or methylaluminum sesquichloride.

References Cited

UNITED STATES PATENTS

| | | | |
|---|---|---|---|
| 2,940,964 | 6/1960 | Mostardini et al. | 252—429 A X |
| 3,152,088 | 10/1964 | Sandri et al. | 252—429 B |
| 2,951,066 | 8/1960 | Coover et al. | 252—431 N X |
| 3,081,287 | 3/1963 | Coover et al. | 252—429 B X |
| 3,458,489 | 7/1969 | Natta et al. | 252—429 B X |
| 3,459,725 | 8/1969 | Natta et al. | 252—429 B X |
| 2,923,702 | 2/1960 | Lyons et al. | 252—429 A X |
| 3,281,375 | 10/1966 | Vandenberg | 252—429 A |
| 3,304,269 | 2/1967 | Kroll et al. | 252—428 X |
| 3,449,310 | 6/1969 | Dall'Asta et al. | 252—429 B X |
| 3,631,111 | 12/1971 | Tucci | 252—431 P X |
| 3,663,480 | 5/1972 | Zelinski et al. | 252—431 R X |
| 3,668,146 | 6/1972 | Ruhle | 252—429 B X |
| 3,686,136 | 8/1972 | Doyle | 252—431 P X |

PATRICK P. GARVIN, Primary Examiner

U.S. Cl. X.R.

252—428, 429 B, 431 R, 431 P, 442; 260—683, D; 252—429 R

UNITED STATES PATENT OFFICE
CERTIFICATE OF CORRECTION

Patent No. 3,778,385                    Dated December 11, 1973

Inventor(s) Ernest A. Zuech

It is certified that error appears in the above-identified patent and that said Letters Patent are hereby corrected as shown below:

Column 14, beginning at line 27, "wherein R is an aromatic or saturated aliphatic" and running through line 39, "is from about 0.1:1 to about 20:1." should be flush with the left-hand margin; line 45, after "n-heptanoic acid," insert -- n-octanoic acid, --; line 46, before "eicosanoic" insert -- n- --; line 47, delete "n-triacontanic" and insert -- n-triacontanoic --; line 48, delete "cyclohexanecarboylic" and insert -- cyclohexanecarboxylic --; line 70, after "further" insert -- including --. Column 15, line 18, after "MoCl$_3$(stearate)$_2$" delete "," and insert -- or --.

Signed and sealed this 15th day of May 1974.

(SEAL)
Attest:

EDWARD M. FLETCHER, JR.            C. MARSHALL DANN
Attesting Officer                  Commissioner of Patents